United States Patent
Durin et al.

(10) Patent No.: US 6,193,434 B1
(45) Date of Patent: Feb. 27, 2001

(54) CONNECTING SPLICE FOR CABLE TROUGH SECTIONS, AND RESULTING CABLE TROUGH SECTIONS

(75) Inventors: Michel Durin, Saint Cyr l'Ecole; Claude Badey, Saclay; James Deciry, Compiègne, all of (FR)

(73) Assignee: Metal Deploye S.A., Montabard (FR)

( * ) Notice: Subject to any disclaimer, the term of this patent is extended or adjusted under 35 U.S.C. 154(b) by 0 days.

(21) Appl. No.: 09/043,218

(22) PCT Filed: Jul. 23, 1997

(86) PCT No.: PCT/FR97/01368

§ 371 Date: Mar. 17, 1998

§ 102(e) Date: Mar. 17, 1998

(87) PCT Pub. No.: WO98/04860

PCT Pub. Date: Feb. 5, 1998

(30) Foreign Application Priority Data

Jul. 26, 1996 (FR) .................................................... 96 09686

(51) Int. Cl.[7] .................................. H02G 3/06; F16L 3/26
(52) U.S. Cl. ........................... 403/329; 403/326; 403/309
(58) Field of Search ...................................... 403/326, 329, 403/303, 311, 309; 211/119, 26; 248/49, 68.1; 24/295

(56) References Cited

U.S. PATENT DOCUMENTS

| | | | |
|---|---|---|---|
| 3,767,841 | * | 10/1973 | Anderson et al. ................ 403/309 X |
| 4,393,560 | * | 7/1983 | Kato ......................................... 24/295 |
| 5,203,022 | * | 4/1993 | Finch et al. ...................... 403/309 X |
| 5,384,937 | | 1/1995 | Simon .................................... 24/295 |
| 5,614,153 | * | 3/1997 | Homberg ......................... 403/329 X |

FOREIGN PATENT DOCUMENTS

| | | | |
|---|---|---|---|
| 689646 | * | 6/1964 | (CA) ...................................... 24/295 |
| 418167 | | 3/1991 | (EP) . |
| 2691590 | | 11/1993 | (FR) . |
| 2711208 | | 4/1995 | (FR) . |

* cited by examiner

Primary Examiner—Lynne H. Browne
Assistant Examiner—John R. Cottingham
(74) Attorney, Agent, or Firm—Jacobson, Price, Holman & Stern, PLLC

(57) ABSTRACT

The invention concerns a coupling for assembling wire cable tray unit sections. It comprises two arms (55, 56). Means (57, 58) for mounting the first arm (55) can independently catch the coupling on the first unit section (51, 52). Means for mounting the second arm (56) on a second unit section (53, 54) comprise at least one resilient catch means (60) which can co-operate with a transverse wire of the second unit section (54) during assembly of the two unit sections.

The invention also concerns a cable tray unit section comprising pre-mounted couplings.

3 Claims, 5 Drawing Sheets

CONNECTING SPLICE FOR CABLE TROUGH SECTIONS, AND RESULTING CABLE TROUGH SECTIONS

The present invention relates to wire cable trays and concerns a coupling for assembling unit sections of such cable tray and ready-to assemble cable tray unit sections so obtained.

As is well known, cable trays in general and wire cable trays in particular are intended to bear and guide all types of high or low tension electrical cables for a wide variety of uses, and in general all resilient conductors or channels which span between different points, such as optical fibres.

Such wire cable trays are formed by a wire structure, generally of metal, formed as a mesh. They are generally but not exclusively in the form of a guttering, normally but not exclusively in a U form, and comprise transverse wires, also known as weft wires, which produce the transverse gutter shape and are regularly disposed along the length of the cable tray, which transverse wires are joined by welds or analogous joints to longitudinal wires also known as warp wires distributed over the whole periphery of the guttering. In this way, a bottom and two lateral sides are present in such cable trays, the upper parts of the sides terminating in a longitudinal edge wire. Other configurations are possible.

Such cable trays can be installed in any possible position, non limiting examples of which are with the bottom horizontal, vertical or inclined to the horizontal.

The present invention relates to assembly of all types of wire cable trays, whatever their shape and the distribution, number, cross section, shape, or nature of the various longitudinal and transverse wires or components which constitute the cable tray, a non limiting example of which is described in European patent EP-A-0 298 825.

Such cable trays are generally formed by unit sections of a predetermined length and must be assembled end to end on site to the desired length and in the desired configuration.

Assembly is achieved using assembly parts which can mechanically join two successive unit sections of cable tray. The assembly parts are generally known as couplings. The term coupling or assembly coupling will be used in the present document.

Numerous couplings for wire cable trays are already known.

Such couplings are available to users as accessories which are sold separately from the cable trays, requiring the user to calculate his coupling requirements. In addition, mounting such couplings normally requires the use of tools or supplementary mounting parts.

Further, such couplings can only be mounted on the cable tray when the unit sections to be assembled have been positioned in the workplace in the precise position for mounting.

Mounting thus takes place under uncomfortable conditions or even where access is difficult as it is generally high up.

French patent FR-A-2 691 590 describes self-fixing cable tray unit sections constituted by asymmetric cable tray modules. In that document, one end of a coupling is permanently welded to one end of the module, the other end of the coupling comprising a coupling pin which links to the end of the next module to be assembled.

The use of couplings which are permanently and immovably mounted on the cable trays overcomes some of the difficulties mentioned above but creates other problems for the manufacturer and the user of such cable trays, in particular: supplemental welding operations, and a double stock of cable trays with welded couplings and without welded couplings. Further, if a module is cut because of the length of the installation, according to FR-A-2 691 590, separate couplings must be employed in order to be able to use the portion which does not include the welded couplings.

The aim of the present invention is to provide a coupling which is advantageously free of the disadvantages described above.

The present invention seeks to provide a coupling for wire cable trays which is universal in nature, i.e., which can be sold or used separately, or pre-mounted on one end of a cable tray unit section, the cable tray unit section and the coupling being sold in this case as ready-to-assemble with another cable tray unit section, but the coupling can always be dismantled easily.

The invention also seeks to provide a coupling which can be mounted on and can remain in position on a single end of a first cable tray unit section, assembly of a second cable tray unit section using the same coupling not requiring any dismantling of said coupling from the first unit section and being effected very easily.

The invention also seeks to provide a coupling which has the smallest possible play and which produces the most rigid possible bond between cable tray unit sections, which can however be dismantled, and which also ensures good electrical continuity of the cable tray.

We have sought to provide a coupling with which the cable tray unit sections can be mounted and dismantled easily without requiring specific tools or accessory parts.

We have also sought to provide couplings which are positioned in advance on cable tray unit sections to allow the most compact possible stacking thereof for transport.

The invention provides a coupling for assembling two wire cable tray unit sections, which coupling is longitudinally divided into two arms, each arm being provided with mounting means for latching it removably in position on the end zone of a first unit section and on the end zone of a second unit section respectively. The means for mounting the first arm are independent of those of the second arm and can alone render the coupling solid with the first unit section, the means for mounting the second arm on the second unit section comprising at least one resilient catch means which can co-operate with a transverse wire of the second unit section during assembly of the two unit sections.

In general, the wires of the cable trays are metal wires and the coupling is also metal with strength and resilience characteristics which ensure good assembly conditions.

Thus the means for mounting the first arm can autonomously and independently be used to assemble and latch the coupling on the end of a first cable tray unit section, such an assembly being able to be dismantled at any time.

In order to assemble the second unit section on the first unit section provided with the coupling of the invention, the end of the second cable tray unit section is displaced by a relative coupling-cable tray movement and engaged on the second arm of the coupling, the resilient catch means of the second arm alone latching the second unit section in position following the first unit section.

Assembly is achieved by leaving the first arm of the coupling completely latched and mounted on the first unit section, the coupling being in a kind of block with the first unit section.

Advantageously, the coupling is constituted by a part which is generally in the form of a strip, which may or may not be longitudinally or transversely profiled, the dimensions of which are advantageously such that it can be housed between two longitudinal, preferably successive, wires of the cable tray unit sections to be assembled.

The coupling is advantageously but not exclusively positioned in the mesh constituted at the end of each unit section by two successive longitudinal wires and two successive transverse wires, one of these wires being the transverse wire positioned at the end of the unit section to be assembled.

When the cable tray is provided with lateral sides, the mesh comprising the longitudinal edge wire is advantageously selected.

In a preferred embodiment, the strip constituting the coupling has, except for clearances, a width which equals the distance separating two successive longitudinal wires and between which it is to be mounted.

The strip constituting the coupling can be profiled towards the inside or outside of the cable tray by lapping the edges of the strip to produce a coupling which is more rigid where desired.

In a first embodiment, the mounting means for the first arm, which means are used to position, fix and latch the coupling on the first unit section, are constituted by a longitudinal surface which bears on at least one longitudinal wire of the unit section and to each side of this longitudinal bearing surface is a transverse surface which bears on a transverse wire of the unit section, the two transverse bearing surfaces being adapted to bear on two different successive transverse wires of the unit section. The longitudinal bearing surface and the transverse bearing surfaces are such that they exert bearing forces on their respective wires, the forces exerted by the longitudinal bearing surface being in the opposite sense to the forces exerted by the transverse bearing surfaces and these forces, by dint of friction and a slight elastic deformation, locking the coupling on the cable tray unit section.

In this way the longitudinal bearing surface bears on the inside of a longitudinal wire while the transverse bearing surfaces bear on the outside of the transverse wires, or vice-versa.

The longitudinal bearing surface advantageously bears on the two longitudinal wires located either side of the first arm during mounting.

A guide mark allows precise positioning of the first arm on the corresponding unit section.

The means for mounting the first arm also advantageously comprise a stop means such as a housing or recess which can optionally, by elastic deformation, at least partially house a transverse wire.

The stop means latches the coupling on its unit section, the latching means also serving as a positioning means.

In order to ensure precise positioning on the unit section, the first arm can comprise an abutment in the form, for example, of a tab which will house one of the transverse wires. The stop means can be disposed towards this abutment or on the opposite side.

The transverse bearing surfaces can be constituted by the strip itself or by its edges.

The longitudinal bearing surface can be constituted by a transverse elongation of the strip forming the coupling, the elongation having a shape which can marry with the shape of the longitudinal wire or wires on which this surface will bear. The longitudinal bearing surface can be constituted by several part surfaces all having the same function.

In another embodiment, the means for mounting and positioning the first arm are constituted by at least one tab which can receive a first transverse wire and by a loop which can receive a second transverse wire, the tab/loop assembly latching it on the first cable tray unit section.

The first arm of the coupling, its tab and its loop are advantageously dimensioned so that the tab and the loop bear on their respective wire, engagement of the transverse wire in the loop housing advantageously being made by elastic deformation of the loop.

In this other embodiment and when the loop is located close to the free end of the first arm advantageously a second loop constituting a hinge can be located close to said loop so that the coupling can be turned back along the cable tray in an opposed position to its latched position, a ratchet or equivalent means maintaining the coupling in the turned back position.

The second arm of the coupling comprises at least one resilient catch means which can co-operate with a transverse wire of the second unit section of the cable tray.

This resilient catch means can be located so as to co-operate either with the transverse wire located at the end of the second unit section or with the next transverse wire.

The term "resilient catch means" means any means located on the second arm of the coupling which requires an elastic deformation either of the coupling or of the cable tray or of both at the same time to mount the second cable tray unit section, the coupling and the cable tray regaining their initial shape after latching.

The resilient means can be disposed close to the centre of the coupling or close to the free end of the second arm, depending on which it co-operates with the transverse wire of the end of the second unit section or with the next transverse wire respectively.

Non limiting examples of this resilient means are a resilient guide tongue inclined with respect to the general orientation of the coupling, located close to end of the arm and provided with a housing formed by a crook, for example. As another example, it may consist of a pin constituting a ramp requiring elastic deformation, after which pin there may or may not be a specific housing for the transverse wire.

This pin can be obtained and produced by any means, such as forming to size, stamping, cutting, or attaching parts.

The dimensions of the second arm are advantageously such that it can be housed between two successive longitudinal wires, as with the first arm, the second and the first arm being formed in one and the same strip.

The mounting means for the second arm can comprise a plurality of resilient catch means, each means co-operating with a different transverse wire.

The mounting means for the second arm can also comprise a guide means such as at least one tongue located close to the free end of the arm. The resilient catch means may or may not be located close to the guide means.

Close to its centre, the coupling can comprise a pin forming an abutment on which the transverse wires of the end of the two assembled unit sections will bear when mounted. This pin can be constituted by a tab of the first arm of the coupling, in the case where this first arm comprises a tab located close to the transverse bearing surface near the centre of the coupling.

The means for mounting the second arm and the means for mounting the first arm are preferably located so as to reduce play to a minimum, the second arm and the first arm in the assembled position on their respective unit section being under slight tensile stress.

The invention also concerns the use of the couplings described to produce a wire cable tray unit section in which one end comprises two couplings as described above, mounted and latched onto said unit section by their first arms, the other end of the unit section being free to accept the second arms of two other couplings mounted and latched onto a further unit section to assemble the unit sections together.

Such a wire cable tray unit section comprising couplings of the invention already mounted by their first arms will be termed a pre-mounted unit section.

The invention is thus also relative to a pre-mounted unit section.

Such a pre-mounted unit section is very easy to assemble on the free end of a further pre-mounted, or a non pre-mounted, unit section.

The two unit sections are simply aligned slightly on a slant and the second arms of the two couplings are engaged in the housings of the second unit section which receives them, the housing advantageously being located between two successive longitudinal wires.

After bringing the two unit sections close together, the two unit sections are pushed together axially to engage the resilient catch means provided on each second arm on the transverse wire with which they co-operate.

When the unit section has a U cross section, the two couplings of the pre-mounted unit section are symmetrically located on the lateral sides of the unit section. These couplings can advantageously be housed between the longitudinal edge wire and the next longitudinal wire.

This produces the considerable advantages of the invention, the cable tray unit section being capable of being supplied either pre-mounted or not pre-mounted.

The range of cable tray production does not need to be changed at all. It is sufficient to mount the couplings of the invention onto unit sections to obtain pre-mounted unit sections, depending on demand, for example just before transporting the unit sections. This avoids any heavy welding type operation and has the advantage that bare unit sections without couplings can always be recovered when required.

The design of the couplings of the invention also means that the pre-mounted unit sections can be transported very easily stacked one top of the other.

Dismantling the couplings of the invention, the same as for mounting, does not require any special tools or accessories. However, if necessary a tool such as a screwdriver can be used to lever and facilitate mounting and dismantling the couplings.

The coupling may be constituted by a single one-piece strip which has a shape which can carry out all of the desired functions at the desired positions. It is also possible to produce it in composite form by combining the different components carrying out the different functions, for example by welding or other means on a common support, for example in the form of a strip.

The invention will now be described, by way of non-limiting illustration, with reference to some examples which are shown in the Figures in which.

Figure 1:
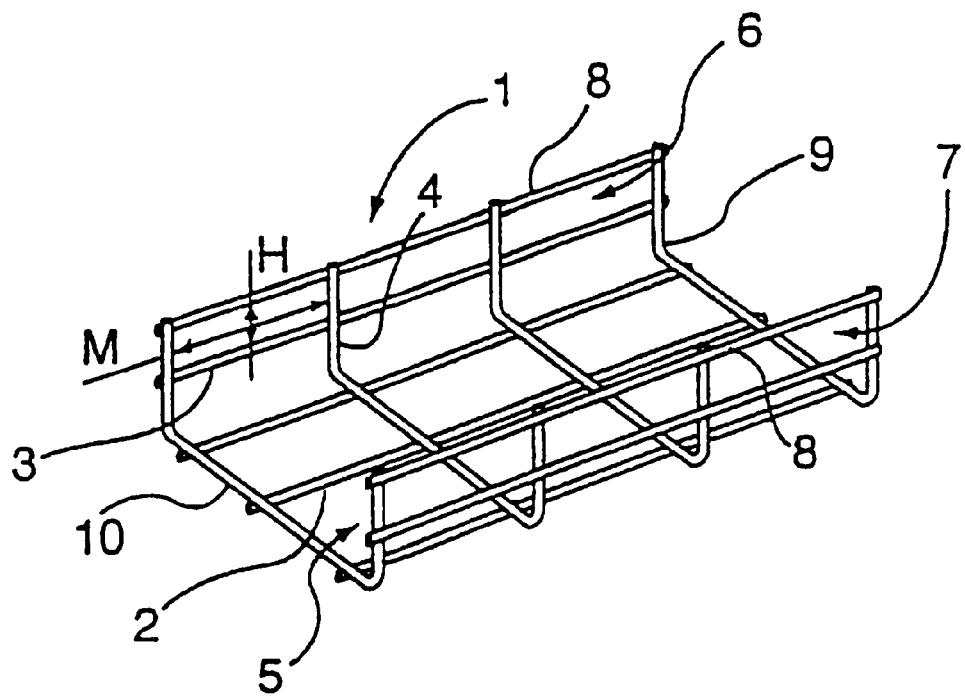
FIG. 1 is a perspective view showing a wire cable tray unit section.

FIG. 1 shows a perspective view of a wire cable tray unit section 1, constituted by longitudinal wires such as 2, 3 assembled in a mesh by welding to transverse wires such as 4 which are generally U shaped, located at regular distances along the cable tray. Thus the cable tray has a flat base 5 and lateral sides such as 6, 7, each of these sides terminating in a longitudinal edge wire 8.

To simplify the figure, unit section 1 is limited to four transverse wires 4, of which two wires 9 and 10 are the wires at the end of the unit section. In practice, such a unit section can have any length and can be several meters long, the unit sections generally being sold in standard lengths of several meters.

Figure 2:
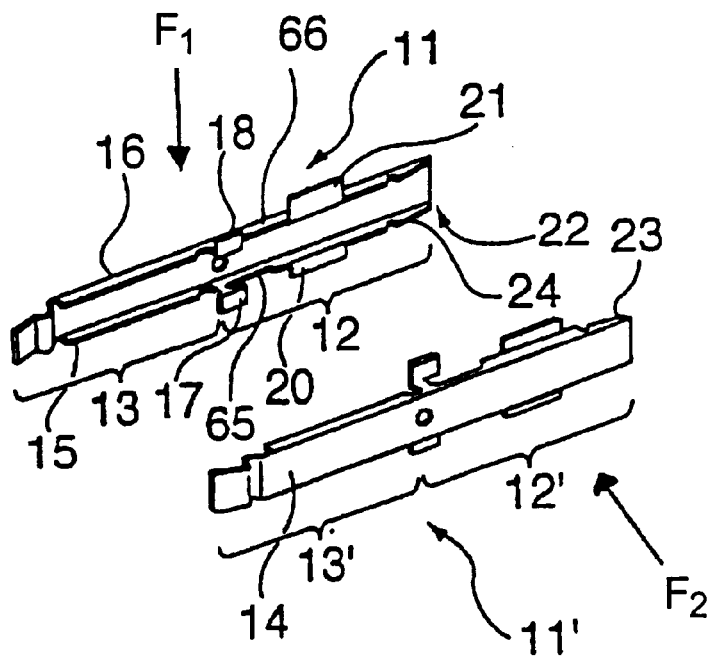
FIG. 2 is a perspective view of a first example of a set of two identical couplings of the invention.
Figure 6:
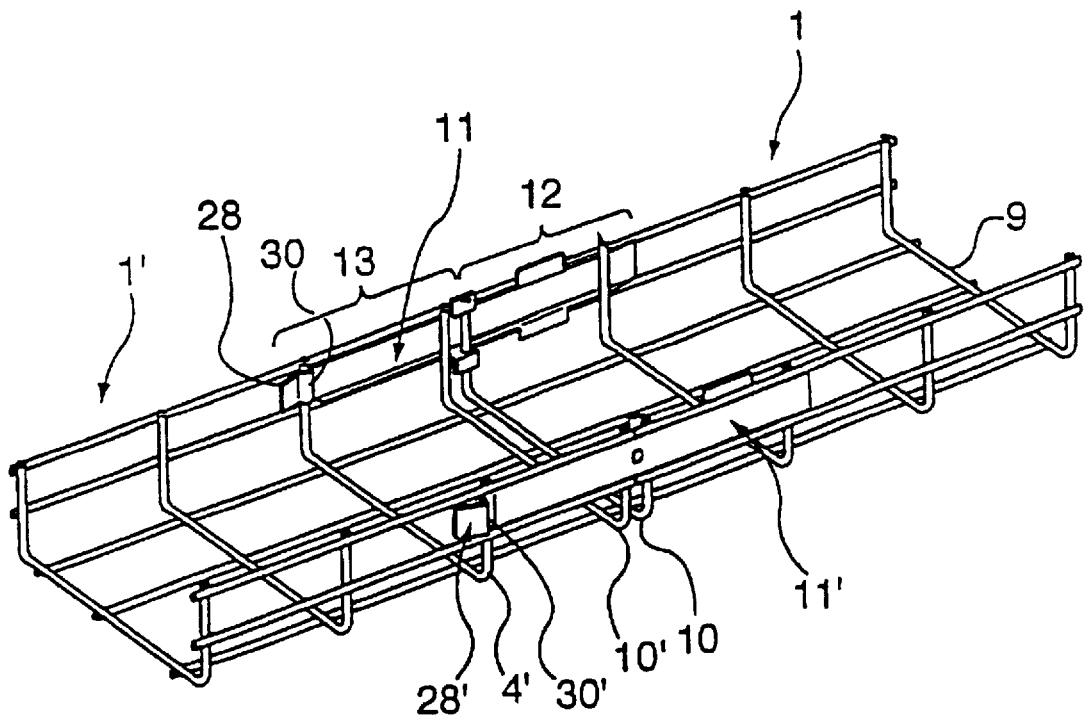
FIG. 6 is a perspective view of two cable tray unit sections identical to that of FIG. 1 assembled using two couplings of FIG. 2.

As a first example, FIG. 2 shows a perspective view of a set of two couplings 11, 11' of the invention for assembling on two cable tray unit sections 1, 1' as shown in FIG. 6.

The two couplings 11 and 11' are identical, only the side from which they are viewed being different, and they are divided longitudinally into two arms: the first arm 12, 12' for mounting on a first unit section, cable tray unit section 1, and the second arm 13, 13' for mounting on a second unit section, cable tray unit section 1'.

Figure 3:
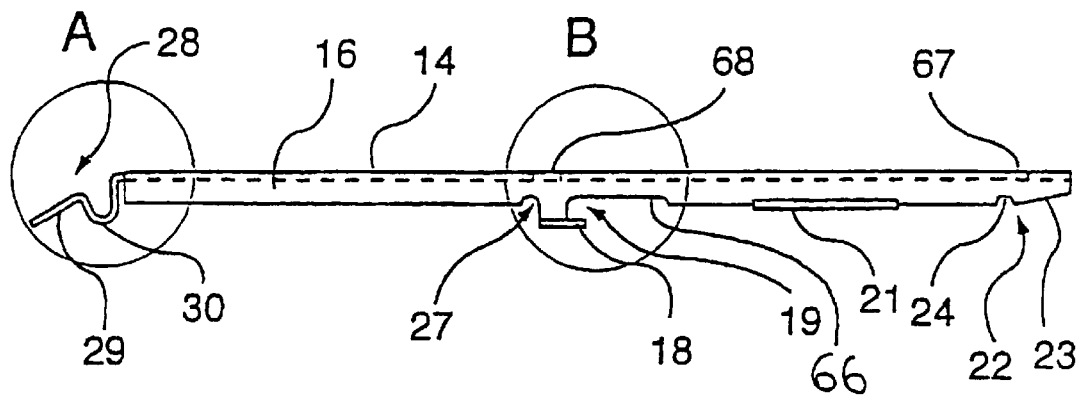
FIG. 3 is a top view of the coupling of FIG. 2 along arrow $F_1$.
Figure 4:
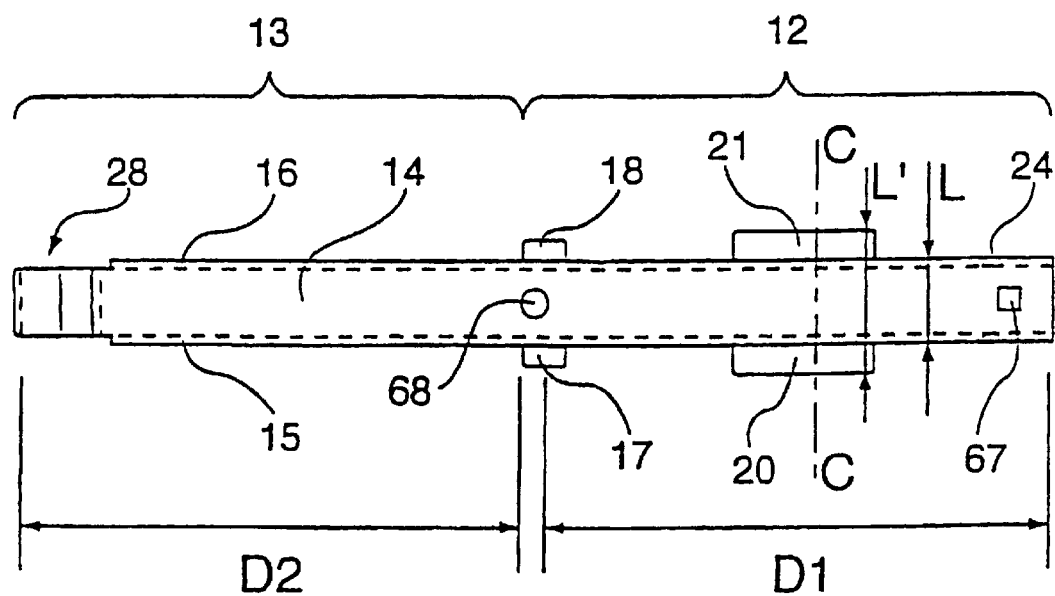
FIG. 4 is a side view of the coupling of FIG. 2 along arrow $F_2$.
Figure 5:
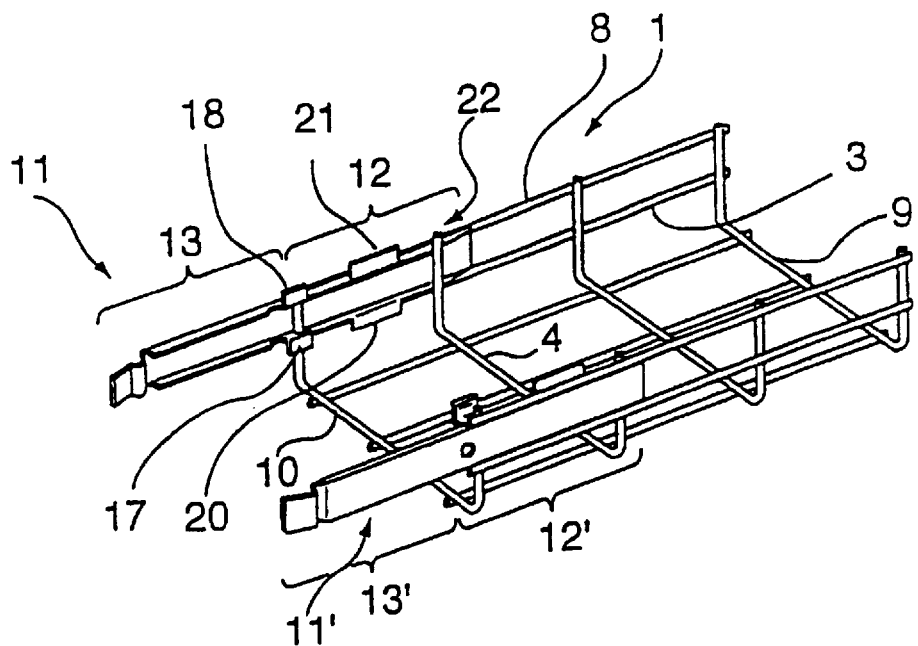
FIG. 5 is a perspective view of the unit section of FIG. 1 on which the couplings of FIG. 2 have been mounted.

The same coupling 11, 11' is shown from other angles in FIGS. 3 and 4. FIG. 5 shows it mounted, latched and positioned on a first cable tray unit section 1. In FIG. 6, the two unit sections 1, 1' are assembled in juxtaposition and in line, connected by couplings 11, 11'.

In the embodiment shown here, the coupling is generally in the form of a one-piece strip 14 with the desired shape in the desired positions to carry out all of the necessary functions, in particular mounting on the first unit section 1 and the second unit section 1' by means of the mounting means.

In accordance with the invention, the mounting means of arm 12, which means will be described below, can autonomously and independently mount, latch and position coupling 11, 11' on a first unit section 1, as shown in FIG. 5.

Thus there is no equivalence or symmetry in the functions of the two arms 12 and 13 of coupling 11, the mounting means of the second arm 13 not allowing independent mounting of coupling 11 on an isolated cable tray unit section, in contrast to the mounting means of the first arm 12.

The major portion of the length of strip 14 comprises, on each of its two edges, a lapped edge 15, 16 which endows the coupling with the desired rigidity, moment and flexibility.

The transverse section of strip 14 is in this case in the form of a U with a flat bottom, the opening of which is oriented towards the inside of the cable tray, the coupling being positioned on the outside of the cable tray.

The width L of strip 14 is advantageously selected so as to equal, apart from clearances, the height H separating two successive longitudinal wires such as 3 and 8, the latter wire constituting the edge wire.

In this way, coupling 11 can advantageously be housed between two successive longitudinal wires, the length D1, D2 of each of arms 12, 13 respectively being a little greater than the length M separating two successive transverse wires 10, 4 for which the means for mounting each of the arms can cooperate with two transverse wires such as 10, 4.

The means for mounting the first arm 12 comprises firstly a longitudinal bearing surface which bears on longitudinal wires 3, 8 which run along coupling 11 when it is mounted, the longitudinal bearing surface in this case being constituted by two lugs 20, 21 located either side of strip 14 and with an overall width L' which is greater than the height H separating two successive longitudinal wires such as 3, 8.

In this way lugs 20, 21 can bear on the inside of two longitudinal wires 3, 8 located either side of coupling 11 during mounting.

Figure 10:
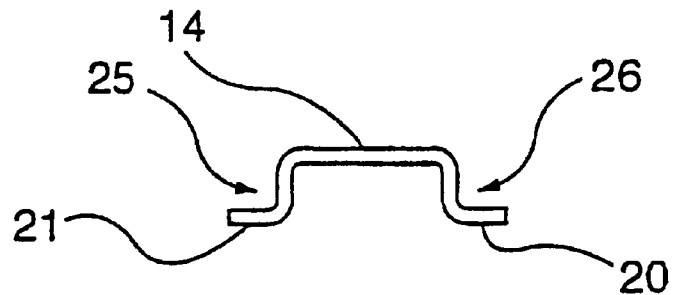
FIG. 10 shows a section along the line C—C in FIG. 4.

FIG. 10 shows a section through plane C—C in FIG. 4 at the position of lugs 20, 21. The lugs are integral with the lapped edge 15, 16 of strip 14 over their entire length, measured parallel to strip 14.

In a variation, lugs 20, 21 are formed so that only a portion of their length is integral with the lapped edge of strip 14.

In this way, for this variation, when bearing on the inside of the longitudinal wires, the bearing surface constituted by such lugs 20, 21 have a resilience in this position which can advantageously adjust for the play which may exist in the positioning of the longitudinal and transverse wires.

Longitudinal wires 3 and 8 are positioned to bear on housings 25, 26, as seen in FIG. 5.

The means for mounting the first arm also comprises a transverse surface for bearing against a transverse wire, either side of the longitudinal bearing surface constituted by lugs 20, 21.

The first transverse bearing surface located close to the centre of coupling 11, i.e., at the inner end of section 12, is constituted by the section 65, 66 of the lapped edge 15, 16 either side of strip 14 completed by a tab 17, 18 which can receive and house a transverse wire of the first unit section 1 in housing 19, in this case the transverse wire of the end 10 as shown in FIG. 5.

The second transverse bearing surface located on the other side of lugs 20, 21 is in this case close to the free end of arm 12.

This second bearing surface 22 is formed in this case by a ramp 23 which is tapered at its edges 15, 16 at the end of arm 12 and which comprises a stop means, in this case a stop notch 24 and means that the coupling can bear on the outside of a transverse wire, in this case 4, corresponding to the free end of this arm 12 of coupling 11, latching said wire in the stop notch 24.

The dimensions, shape and position of lugs 20, 21 on the first transverse bearing surface 65, 66 and of tab 17, 18 and of the second transverse bearing surface 22 are such that arm 12 of the coupling simultaneously bears in opposite directions on the inside of longitudinal wires 3, 8 and on the outside of transverse wires 10, 4 thus causing, due to slight elastic deformation, highly effective latching and blocking of arm 12 in position, coordinated with housing transverse wire 10 in housing 19 of tabs 17, 18, transverse wire 4 being positioned in stop notch 24.

The bearing surface 22 is shown in operation in FIG. 5.

In a variation which is not shown, instead of being constituted by a tab 17, housing 19, which also acts as a bearing surface, can simply be constituted by a stop recess of the same type as stop notch 24, the outside of transverse wire 10 bearing on such a stop notch.

In a further variation which is not shown, in place of two stop notches such as 24, one to receive transverse wire 10, the other to receive transverse wire 4 as described in the preceding paragraph, the first arm comprises only a single housing at one of its extremities.

The advantage of tabs 17, 18 is that, for both the first unit section 1 and the second unit section 1', they constitute a stop projection or pin for the respective end wires of these unit sections, namely 10, 10', wire 10' being positioned in recess 27 located against tab 17, 18, to the side of the second arm 13 of coupling 11.

This stop projection prevents the transverse end wires 10, 10' of unit sections 1, 1' from coming into contact with each other, avoiding any bending problems with the ends of the longitudinal wires.

Further, the zone of strip 14 at right angles to tab 17, 18 can be used to locate a hole such as 68.

This hole allows other accessories to be fixed, such as a part for earthing unit sections 1, 1' or a clamp which ensures electrical continuity of unit sections 1, 1' during assembly.

The means for mounting the second arm 13 on the second unit section 1' comprise a resilient catch means.

In FIGS. 3 and 4, this catch means is constituted by a resilient tongue 28 at the free end of the coupling, the end 29 of the resilient tongue forming an inclined guideway and the tongue comprising a crook 30 forming a catch housing for the transverse wire 4' with which this tongue co-operates. Engaging wire 4' in housing 30 is facilitated by the inclined end 29.

Figure 7:
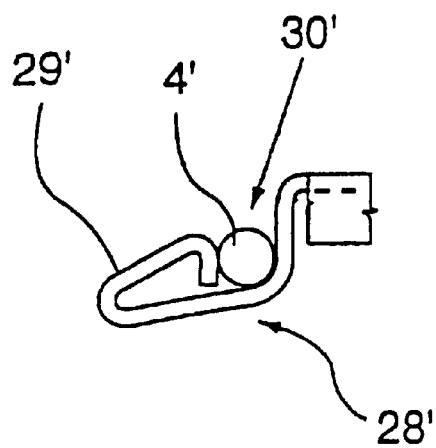
FIG. 7 shows a variation of detail A of FIG. 3.

A variation of the free end of the second arm 13 shown at A is shown in FIG. 7. The shape of resilient tongue 28' provides both a guideway 29' and a housing 30' into which wire 4' catches.

Figure 8:
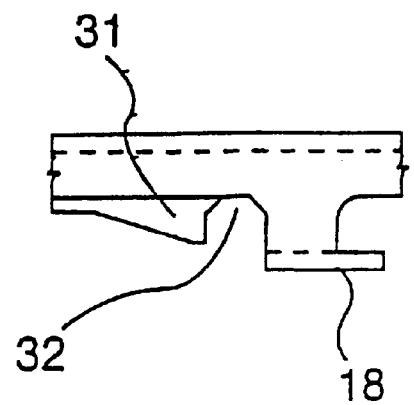
FIG. 8 shows a variation of detail B of FIG. 3.

In a variation, instead of the resilient system shown at A in FIG. 3, the second arm of coupling 11 comprises a system as shown in FIG. 8 which replaces the detail shown in the central portion of the coupling at B in FIG. 3. In this case, the end shown at A in FIG. 3 can advantageously be replaced by the end shown in FIGS. 9a and 9b.

The resilient catch means of FIG. 8 comprises a pin or ramp 31 followed by a recess 32 forming a catch housing for transverse wire 10' at the end of the second unit section 1'.

Figure 9A:
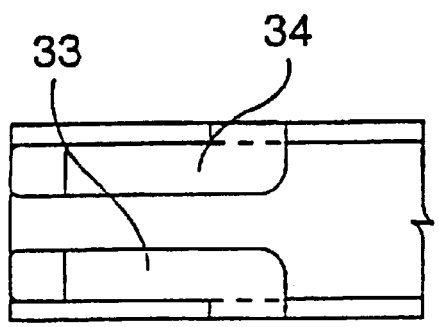
FIGS. 9a and 9b show two views of a variation of detail A of FIG. 3.
Figure 9B:
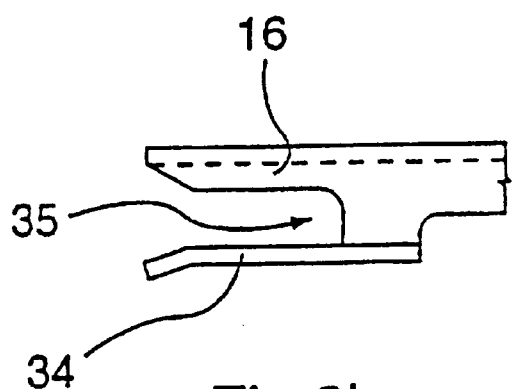

The free end of this unit section 13 advantageously comprises a guide means for a second transverse wire 4' as shown in FIGS. 9a and 9b, constituted by a fork. Transverse wire 4' is housed between strips 33, 34 and edges 15, 16 of the coupling at its end, the free end of the fork being flared out to facilitate guiding of the transverse wire 4' and the base 35 of the fork forming the housing for wire 4'.

It can be seen that in this case that both the resilient means shown at A in FIG. 3 and those shown in FIG. 8 require elastic deformation either of the cable tray, and in particular of the transverse wire of unit section 1' with which these means co-operate, or of the coupling, or both at once to effect catching and assembly of the second unit section 1' on the couplings already mounted on the first unit section 1.

FIG. 5 shows a pre-mounted unit section 1 of the invention, two couplings 11, 11' being mounted symmetrically by their first arm 12, 12' on the lateral edges 6, 7 of unit section 1, between the edge wire 8 and the next longitudinal wire 3, the other end 9 of unit section 1 being ready to receive a further pre-mounted unit section. Pre-mounted unit section 1 is ready to receive a new unit section 1' identical to unit section 1 on the two second arms 13, 13' of the two couplings 11, 11'.

Mounting is achieved by bringing the two unit sections 1, 1' into a slightly slanted alignment then using the guide means described above located at the free ends of arms 13, 13' of the couplings to engage the transverse wire 4' in the catch housings 30, 30' by pushing the two unit sections 1, 1' together along the mutual axis.

Similarly, the other free end of unit section 1 is ready to receive a new pre-mounted unit section, and in this way a length of wire cable tray can be assembled very easily.

Figure 11:
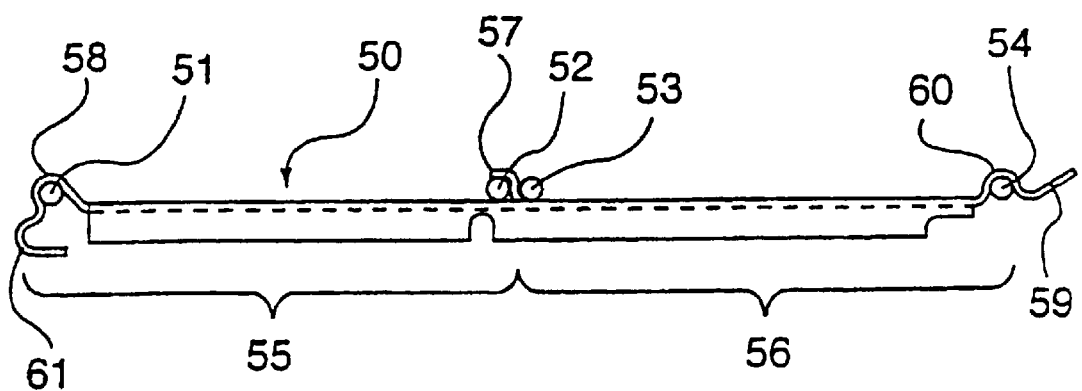
FIG. 11 is a top view of a further embodiment of a coupling of the invention mounted on two assembled cable tray unit sections.
Figure 12:
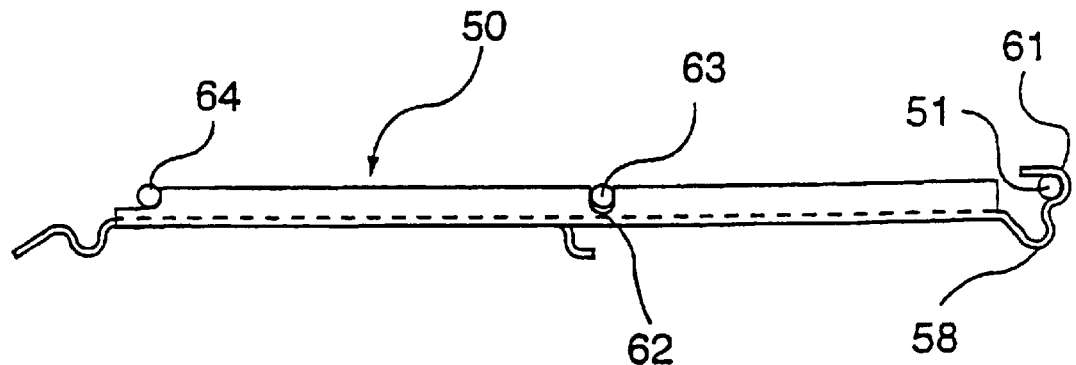
FIG. 12 is a top view of the coupling of FIG. 11 turned back on a first cable tray unit section.

FIGS. 11 and 12 show a further embodiment of the coupling of the invention.

In FIG. 11, a coupling 50 is shown mounted on two cable tray unit sections in the assembled position, the first unit section being represented as two transverse wires 51, 52, wire 52 being the end wire, the second unit section also being represented as two transverse wires 53, 54, wire 53 being the end wire. Reference numeral 55 designates the first arm and reference numeral 56 designates the second arm of coupling 50, which is again in the general form of a strip with lapped edges.

The mounting means for the first arm comprises a tab 57 for housing wire 52 and, located at the free end of this arm 55, a loop 58 which can house and latch the coupling on wire 51.

In the case of FIG. 11, the coupling does not include a bearing surface for the longitudinal wires, mounting being effected solely using two successive transverse wires, in this case 52, 51.

The second arm 56 comprises a resilient tongue means 59 with an inclined guideway and a crook 60 forming a catch housing for wire 54, similar to that shown at detail A of FIG. 3.

When mounted, the end wire 53 of the second unit section is positioned close to tab 57, outside this tab.

The coupling of FIG. 11 comprises a second loop 61 at the end of the first arm 55, following loop 58.

This second loop 61 can catch around the back of the coupling on a cable tray unit section and hold it between a transverse wire housed in this second loop 61 and a housing recess 62 receiving the next transverse wire. In this way the coupling is held outside the unit section on which it is intended to be mounted.

Loop 61 acts as a kind of hinge.

This coupling is advantageously held by using the same wire as that used for mounting on the first unit section as the transverse wire housed in the second loop 61, in this case wire 51, the other wires 63, 64 naturally being positioned in their housing.

In this way, the coupling can simply be pivoted by 180° about wire 51 to bring it into the mounted position and produce a pre-mounted unit section.

It can be seen that in all of the Figures, the first arm can be mounted very easily on the first cable tray unit section. For the first embodiment depicted in FIGS. 2 to 10, mounting is effected by sliding coupling 11, 11' over the longitudinal and transverse bearing surfaces until it latches into position, latching being encouraged by the presence of tabs 17, 18 and stop notch 24. It is dismantled by a sliding force in the opposite direction.

If necessary, a screwdriver type tool can be used to facilitate and/or dismantle the coupling. To this end, a hole, for example a square hole 67, is provided in arm 12 of strip 14 outwardly of the stop notch 24, and a screwdriver is pushed against the edges of hole 67 to lever on transverse wire 4 in one direction or another to engage or disengage transverse wire 4 from housing notch 24.

For the second embodiment shown in FIGS. 11 and 12, the first arm is mounted on the first unit section by engaging the transverse wire of end 52 and wire 51 in their respective housings, starting by placing wire 52 in tab 57, wire 51 then engaging resiliently in loop 58. A reverse operation dismantles it.

Further, the mounting means of each arm 12, 13, 55, 56 are advantageously positioned and dimensioned such that each arm of the coupling when assembled and latched onto its corresponding unit section has minimum or zero play with respect to the unit section onto which is it latched.

This is achieved by providing that the various mounting means for each arm are disposed so that a slight tensile stress is set up in the corresponding arm.

This prevents any vibration or wobble of the coupling in service both for pre-mounted unit sections and for unit sections assembled two by two.

Mounting and dismantling of the couplings of the invention requires no accessory parts, as explained above.

It can thus be seen that the coupling of the invention is universal in nature and is polyvalent in that it can either be used as a coupling which is separate from the cable tray unit sections or as pre-mounted unit sections.

Many modifications or variations of the above examples of the coupling and pre-mounted cable tray unit section of the invention can be made without departing from the scope of the invention.

What is claimed is:

1. In combination, first and second cable tray unit sections assembled in longitudinal alignment and each being constituted by a mesh of longitudinal and transverse wires, and a pair of couplings rigidly and detachably connecting said first and second cable tray unit sections, each said coupling having the general form of an elongated strip being longitudinally divided into first and second arms, said first arm of each coupling being provided with mounting means for latching said first arm removably in position on an end zone of said first tray unit section, said second arm being provided with mounting means latching said second arm removably in position on an end zone of said second tray unit section, said mounting means latching the first arm to said first tray unit section without permanent deformation of said mounting means and alone rendering the coupling solid with said first tray unit section, said mounting means latching the second arm to said second tray unit section including at least one resilient catch means cooperating with a transverse wire of said second tray unit section to catch said transverse wire without permanent deformation of the catch means during assembly of said couplings and said unit sections, said mounting means latching said first arm of each coupling on said first tray unit section in response to a first relative longitudinal movement between each coupling and said first tray unit section, said mounting means latching said second arm of each coupling on said second tray unit section in response to a second relative longitudinal movement between each coupling and said second tray unit section after the first arm of each coupling has been assembled on the first tray unit section.

2. The combination as defined in claim 1, wherein said mounting means for latching said first arm to said first tray unit section includes surfaces on said strip moveably engaging longitudinal and transverse wires in longitudinally spaced areas and on opposite surfaces thereof, said surface engaging one of said transverse wires including a releasable latch biasing said engaging surfaces in opposite directions to securely and removably mount the first arm of the strip to said first tray unit section.

3. The combination as defined in claim 2, wherein said mounting means on said second arm includes surfaces on said strip moveably engaging transverse wires in longitudinally spaced areas and on opposite surfaces thereof, said surface engaging one of said transverse wires including a notch resiliently housing said one transverse wire therein when the tray unit sections are assembled by longitudinal movement of said second tray unit section toward said first tray unit section having said couplings mounted solidly thereon by said mounting means on said first arm.

* * * * *